United States Patent Office 2,766,229
Patented Oct. 9, 1956

2,766,229
PREPARATION OF SULFONYLTRIAZENES

William Baptist Hardy and Frederic Henry Adams, Bound Brook, N. J., assignors to American Cyanamid Company, New York, N. Y., a corporation of Maine No Drawing. Application December 14, 1954,
Serial No. 475,283

11 Claims. (Cl. 260—140)

This invention relates to sulfonyltriazenes. More particularly, it relates to the preparation of N-substituted sulfonyltriazenes. Still more particularly, this invention relates to the preparation of N-cyanoalkyl sulfonyltriazenes.

The class of compounds prepared in accordance with the novel process of this invention find application in various fields. For instance, they are useful in the fields of pharmaceuticals, dyes, rubber processing, and the like. Particularly, this class of compounds has been found to be exceptionally useful as blowing agents in the preparation of cellular organoplastic materials. The process of preparing such cellular organoplastic materials forms the subject matter of applicants' copending application 475,284 filed of even date.

The known procedure for preparing N-alkyl substituted sulfonyltriazenes involves reacting a diazo compound with a sulfonamide to first form an intermediate diazoamido compounds. The intermediate product is then subjected to direct alkylation with a lower dialkyl sulfate whereby the nitrogen bound hydrogen is replaced by an alkyl group.

Because of the limited existence of alkylating agents of the dialkylsulfate class, however, the procedure is limited to the preparation of lower alkyl derivatives such as the methyl and ethyl derivatives. N-cyanoalkyl sulfonyltriazenes cannot be prepared by this method since cyano-substituted dialkyl sulfates do not exist. Moreover, cyanoalkyl sulfonyltriazenes cannot be prepared from N-alkyl sulfonyltriazenes by introduction of the cyano group directly into the alkyl radical because of the lack of reactivity of the alkyl radical. In addition, the relative instability of the sulfonyltriazene itself makes such a reaction unfeasible.

Surprisingly, it has now been found that N-cyanoalkyl sulfonyltriazenes may be prepared by reacting under proper conditions a sulfonyltriazene with an acrylonitrile. It is known, of course, that acrylonitrile will react with amines and amides to form the corresponding N-cyanoalkyl derivatives. However, the process of the present invention does not involve such a simple and straightforward alkylation in which the entering alkyl group attaches to the same nitrogen as the replaced hydrogen. Instead, whereas the hydrogen of the sulfonyltriazene is attached to the nitrogen next to the SO₂ group, the entering alkyl group becomes attached to the nitrogen two atoms removed therefrom. This course of reaction could in no manner be expected from the known direct alkylation of amines and amides. Moreover, it could not in the least be predicted on the basis of the known method of alkylating sulfonyltriazenes which requires the use of a dialkylsulfate as the alkylating agent.

The N-cyanoalkyl sulfonyltriazenes prepared in accordance with the process of this invention using an intermediate diazoamido compound prepared from a monosulfonamide and a monodiazo may be represented by the formula

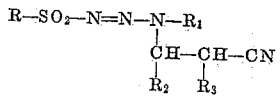

in which R is an organic radical such as aliphatic, aralkyl, aryl and heterocyclic radicals which may be substituted; $R_1$ is an aryl or heterocyclic radical which may be substituted; and $R_2$ and $R_3$ are hydrogen or lower alkyls of 1-4 carbon atoms.

In preparing the intermediate diazoamido compound, various mono-sulfonamides may be employed. These may include, for instance, cycloalkylsulfonamides such as cyclohexanesulfonamide and the like; aralkylsulfonamides such as phenylmethanesulfonamide, phenylethanesulfonamide, and 2-, 3-, or 4-nitrophenylmethanesulfonamide; aryl sulfonamides such as benzenesulfonamide, o, m, and p-ethylbenzenesulfonamides, o, m, and p-chlorobenzenesulfonamides, o, m, and p-methylbenzenesulfonamides, o-xylene-, 3-, 4-, and 5-sulfonamides, biphenyl-4-sulfonamide, 1- and 2-naphthalenesulfonamides, 1-nitro-3-, 4-, 5-, 6-, 7-, and 8-naphthalene sulfonamides, 1-acetoxynaphthalene-6-sulfonamide, 2-chloronaphthalene-6-sulfonamide, anthracene-1- and 2-sulfonamides, phenanthrene-2, 3- and 9-sulfonamides and acenaphthene-3-sulfonamide; and heterocyclic sulfonamides such as 3-pyridine-sulfonamide, quinoline-5-sulfonamide, isoquinoline-5- or 8-sulfonamide, benzimidazole-5-sulfonamide, 2-acetoxycarbazole-7-sulfonamide, 1,2-benzocarbazole-3-sulfonamides, dibenzofurane-2-sulfonamide, dibenzothiophene-2-sulfonamide, 2-acetamidothiazole-5-sulfonamide, 5-acetamido-2-thiadiazole sulfonamide, and the like.

As the monodiazo component in the preparation of the intermediate diazoamido compound, there may be used the diazo compound prepared from any of various aromatic amines of the aromatic and heterocyclic series. Amines of the benzene and naphthalene series are preferred; for example, the o-, m-, and p-substitution products of aniline such as the o-, m-, and p-methoxy, methyl and chloro derivatives. Di and poly substituted anilines may be used, such as o-, m-, and p-xylidines, and 4-benzoylamino-2,5-diethoxyaniline. A similar range of naphthalene diazo compounds may be used such as those derived from 1- or 2-naphthylamine or 4-methyl-1-naphthylamine, 4-ethyl-1-naphthylamine, 4-methyl-2-naphthylamine, 4-ethyl-2-naphthylamine, and the like.

In the process of this invention, diazoamido compounds prepared from bis-sulfonamides may also be employed. These are preferably mono- and diarylene bis-sulfonamides in which the nuclei of the diarylene radical may be interposed by an oxygen or sulfur atom. Examples of such bis-sulfonamides are, for instance, biphenyl-4,4'-bis-sulfonamide, naphthalene-1,5-bis-sulfonamide, toluene-2,4-bis-sulfonamide, o-xylene-3, 5-disulfonamide, anthracene-1,5-bis-sulfonamide, acenaphthene-5,6-disulfonamide, 4,4-biphenylene-bis-sulfonamides, 1,1'-oxy-4,4'-bis(benzenesulfonamide), and the like.

Similarly, amido compounds prepared from tetrazo compounds may be used in the process of this invention. These are preferably diarylene tetrazo compounds in which the nuclei may be interposed by an oxygen or sulfur atom. For instance, such tetrazo compounds may be employed as biphenyl tetrazonium salts, oxy-biphenyl tetrazonium salts, thiobiphenyl tetrazonium salts, dinaphthyl tetrazonium salts, and the like.

The acrylonitrile which may be employed in accordance with the process of this invention may be represented by the formula:

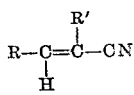

in which R and R' may be hydrogen or a lower alkyl radical of 1–4 carbon atoms. In addition to acrylonitrile itself, there may be employed, for instance methacrylonitrile, crotononitrile, β-ethyl acrylonitrile, β-isopropylacrylonitrile, β-isobutylacrylonitrile, and the like.

The intermediate diazosulfonamide is prepared by known methods and is usually obtained in the form of an aqueous alkaline solution. To this aqueous alkaline solution of diazosulfonamide is added the acrylonitrile corresponding to the cyanoalkyl derivative which it is desired to obtain. In order to obtain satisfactory yields of the cyanoalkyl sulfonyltriazene, it is necessary to employ at least stoichiometric quantities of the acrylonitrile. In some instances, improved yields may be obtained by employing an excess of the acrylonitrile. The addition of the acrylonitrile is preferably made with stirring and stirring continued until the reaction is complete.

Temperature during the reaction may be quite widely varied. Temperatures as high as 60° C. and even higher may be employed with satisfactory results. The best results, however, are obtained using lower temperatures, i. e., less than 30° C., and preferably between about 0° to about 15° C. Alkalinity of the reaction mixture may vary but preferably should be greater than a pH of about 10. If necessary, it may be controlled by the addition of alkali, for instance, sodium or potassium hydroxide. On completion of reaction, the solid product may be separated by conventional methods, washed with water and dried.

The reaction is preferably carried out in an aqueous medium. However, organic solvents or mixtures of such solvents with water may also be employed provided the solvent is inert to the reaction. The use of organic solvents, however, creates a recovery problem which can otherwise be avoided by the use of an aqueous system.

The process of this invention is further demonstrated by the following examples which are intended to be illustrative only and not by way of limitation. Unless otherwise noted, all parts are by weight.

EXAMPLE 1

*3-beta-cyanoethyl-3-phenyl-1-benzenesulfonyltriazene*

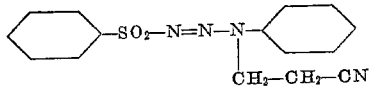

A benzenediazonium chloride solution was prepared by adding a solution comprising 21 parts of sodium nitrite in 40 parts water to a solution comprising 28 parts of aniline, 125 parts of water and 107 parts of 37% HCl at 0°–5° C. The benzene diazonium chloride solution was then added, at 0–5° C. and with stirring, to a solution comprising 120 parts of 50% NaOH in 2000 parts of water to which had been added 48 parts of benzene sulfonamide. To the resultant solution was slowly added with stirring 80 parts of acrylonitrile and stirring continued until reaction completed, temperature being maintained less than 5° C. The product was isolated by filtration, washed and dried (M. P. 109–111° C.).

EXAMPLE 2

*3-beta-cyanoethyl-3-phenyl-1-(para-tolyl)sulfonyltriazene*

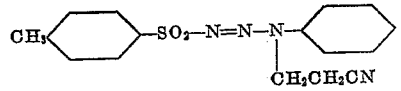

To a solution comprising 74.4 parts of aniline, 330 parts of water and 240 parts of 37% hydrochloric acid, there was added, at about 0–5° C., 166 parts of 5 N. sodium nitrite solution. This was then added, at 0–5° C. and with stirring, to a solution comprising 323 parts of 50% sodium hydroxide, 5500 parts of water, and 144 parts of para-toluene-sulfonamide. There was then added, slowly with stirring, 213 parts of acrylonitrile, the mixture stirred and allowed to stand at room temperature until the reaction was substantially complete. The product was isolated by filtration, washed with water and dried (M. P. 110° C.).

EXAMPLE 3

*3-beta-cyanoethyl-3-(para-chlorophenyl)-1-benzenesulfonyltriazene*

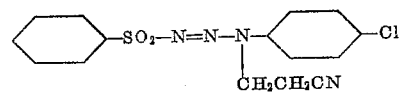

To a solution comprising 38.3 parts of para-chloroaniline, 140 parts of water and 90 parts of 37% hydrochloric acid, there was added, at about 0–5° C., a solution of 21 parts of sodium nitrite in 40 parts of water. This solution was then added, with stirring and at 0.5° C., to caustic solution comprising 122 parts of 50% sodium hydroxide, 200 parts of water and 50 parts of para-toluenesulfonamide. There was then added, slowly with stirring, 48 parts of acrylonitrile and the mixture stirred until the reaction was substantially complete, keeping the temperature below 5° C. The product was isolated by filtration, washed with water, and dried (M. P. 127–129° C.).

EXAMPLE 4

*3-β-cyanoethyl-3-p-tolyl-1-(5-acetamido-2-thiadiazolesulfonyl)-triazene*

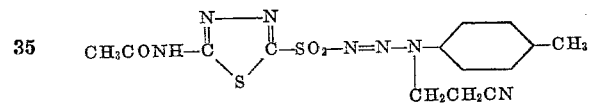

A solution of p-toluidine diazo was prepared by icing a mixture of 21.4 parts p-toluidine with 150 parts water and 7.6 parts of 37.5% hydrochloric acid, and then adding 40 parts by volume of a sodium nitrite solution containing 20.7 parts of sodium nitrite. The solution of diazo was slowly added to a solution made by adding 38 parts of 5-acetamido-2-thiadiazolesulfonamide to 1700 parts of water and 80.6 parts of 50% sodium hydroxide solution and icing. To the resultant solution of 3-p-tolyl-1-(5-acetamide-2-thiadiazolesulfonyl)-triazene was added a solution made by mixing 54 parts of acrylonitrile with 54 parts of water. Addition was gradual and the mixture stirred about five hours at a temperature of 20–25° C. The cyanoethylated product was isolated by filtration, washed with water until free of alkalinity and dried.

EXAMPLE 5

*3-(β-cyanopropyl)-3-phenyl-1-benzenesulfonyltriazene*

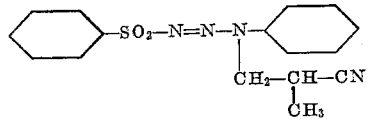

The procedure of Example 1 is repeated except 101 parts of methylacrylonitrile are substituted for the acrylonitrile. The reaction product was 3-(β-cyanopropyl)-3-phenyl-1-benzenesulfonyltriazene.

EXAMPLE 6

*3-(β-cyano-α-methyl-ethyl)-3-phenyl-1-(p-toluenesulfonyltriazene)*

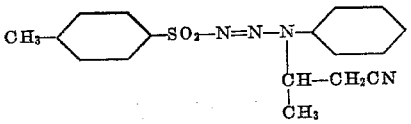

The procedure of Example 2 is repeated, replacing the acrylonitrile with 268 parts of crotononitrile. The product obtained is 3-(β-cyano-α-methyl-ethyl) 3-phenyl-1-(p-toluene sulfonyltriazene).

EXAMPLE 7

*3-β-cyanoethyl-3-p-chlorophenyl-1-(β-naphthalenesulfonyltriazene)*

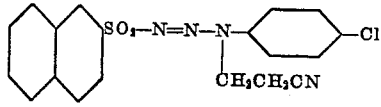

Example 3 is repeated, using instead of 50 parts of p-toluene-sulfonamide, 62.2 parts of naphthalene-2-sulfonamide. The product obtained is 3-β-cyanoethyl-3-p-chlorophenyl-1-(β-naphthalene-sulfonyltriazene).

We claim:

1. A process for preparing N-cyanoalkylsulfonyltriazenes which comprises reacting a member selected from the group consisting of acrylonitrile and the lower alkyl substituted derivatives thereof, and a member selected from the group consisting of mono- and bicyclic aromatic diazosulfonamides and thiadiazole diazosulfonamides.

2. A process, according to claim 1, in which the diazosulfonamide is one obtained by reacting a monosulfonamide with a diazo compound.

3. A process, according to claim 2, in which the diazo compound is a tetrazo compound.

4. A process, according to claim 1, in which the diazosulfonamide is one obtained by reaction of a bis-sulfonamide with a diazo compound.

5. A process for preparing an N-cyanoalkylsulfonyltriazines of the formula:

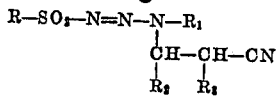

in which R is selected from the group consisting of aryl radicals of the benzene and naphthalene series and thiadiazolyl radicals; $R_1$ is an aryl radical of the benzene and naphthalene series; and $R_2$ and $R_3$ are selected from the group consisting of hydrogen and lower alkyls of 1–4 carbon atoms, which comprises reacting a diazosulfonamide with an acrylonitrile.

6. A process, according to claim 5, in which the reaction is conducted in an aqueous alkaline solution.

7. A process, according to claim 6, in which the pH is greater than about 10.

8. A process, according to claim 5, in which the nitrile is acrylonitrile.

9. A process for preparing 3-beta-cyanoethyl-3-phenyl-1-benzenesulfonyltriazene which comprises mixing at least a substantially stoichiometric amount of acrylonitrile with an aqueous caustic solution of N-phenylazo-benzenesulfonamide at less than about 15° C.

10. The process for preparing 3-beta-cyanoethyl-3-phenyl-1-(p-tolyl)sulfonyltriazene which comprises mixing at least a stoichiometrical quantity of acrylonitrile with an aqueous caustic solution N-phenylazo-p-toluene-sulfonamide at less than about 15° C.

11. The process for preparing 3-beta-cyanoethyl-3-(p-chlorophenyl)-1-benzene sulfonyl-triazene which comprises mixing at least a substantially stoichiometrical quantity of acrylonitrile with an aqueous caustic solution of N-phenylazo-p-chlorobenzenesulfonamide at less than about 15° C.

No references cited.